Figure 1:
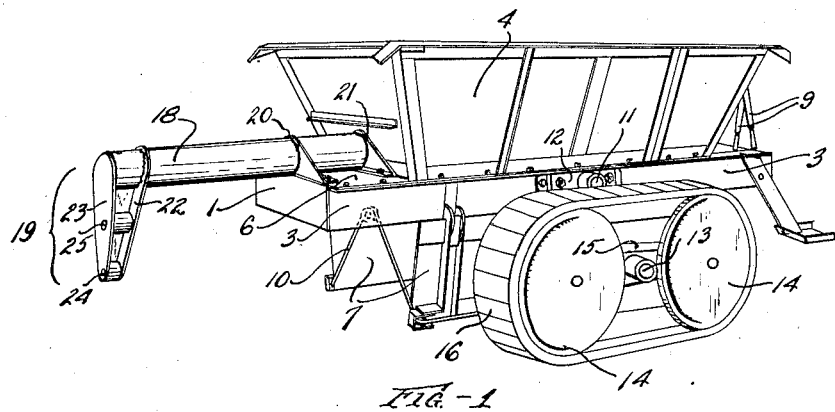

INVENTOR
ARTHUR P. ARMINGTON
AND
STEWART F. ARMINGTON
BY
ATTORNEYS

Patented June 11, 1929.

1,716,810

UNITED STATES PATENT OFFICE.

ARTHUR P. ARMINGTON AND STEWART F. ARMINGTON, OF WILLOUGHBY, OHIO, ASSIGNORS TO THE EUCLID CRANE & HOIST COMPANY, OF EUCLID, OHIO, A CORPORATION OF OHIO.

DUMP-TRAILER HITCH MEANS.

Original application filed September 7, 1928, Serial No. 304,462. Divided and this application filed April 10, 1929. Serial No. 354,031.

This invention relates to earth moving apparatus of the dump trailer type and adapted for use in a train with other similar trailers, as drawn by a heavy-duty tractor between loading and dumping positions.

A typical dump trailer of the class to which reference is had, comprises as its principal parts a load container, a frame, mobile supporting means therefor, and hitch means.

The principal parts of the container are a hopper opening downwardly and, of course, open at its top, and gate means associated with the bottom opening of the hopper to control dumping of the load therefrom, and which may take the form of doors swinging downwardly and outwardly from closed position, about longitudinal axes.

The frame is of generally rectangular form, rigid, and conveniently fabricated of structural steel sections, with castings associated therewith if desired. Where the frame is of considerable depth it may be so arranged relative to the hopper that portions of the frame cooperate therewith to define the load-containing volume, in which case the hopper gates are more conveniently mounted on the frame, as in hinged relation with the side members thereof; the frame also having in such case, transverse members associated with the lower end extremities of the hopper bottom, to define the frame dump clearance.

As to the mobile supporting means of the trailer, this invention particularly contemplates a location thereof intermediate, and preferably substantially medial of the ends of the vehicle; and a relationship between the supporting means and the other parts of the vehicle such that said parts may tilt as a unit upon the supporting means and in a longitudinal plane, and whereby the distribution of load, both live and dead, will be substantially equal and uniform fore and aft of the axis of tilt. In other words the trailer is of the so-called cart type, that is, equipped with a single running gear means such as a single pair of wheels by which substantially all of the load is carried, in substantially balanced relation thereon. Such supporting means comprise generally medially located axle means and running gear associated therewith. The axle means, by which term is included an axle or something to replace the same as in substitution therefor, is generally of arched form in order that the hopper may be sufficiently elevated to clear the dumped load, that the axle means may arch over the dumped load to clear the same, that the running gear dimensions may be less than would otherwise be possible, and that the container gate means may be cleared of the load when in open position; and the axle means may comprise an assembly of several parts. The running gear comprises a pair of similar oppositely disposed units arranged one on either side of the vehicle and associated with the outer and lowered portions of the axle means. The running gear ordinarily includes rolling members such as wheels, and preferably is of creeper type such as having paired wheels about which are trained an endless tread linkage.

Hitch means are of course located at the forward and rear ends of the vehicle, as secured with and preferably centrally of the frame end members.

The subject matter of the present case pertains to the hitch means, and this case is a division of our copending application, Serial No. 304,462, filed September 7, 1928.

As already described, the working conditions require that the frame have considerable elevation above the ground level; and for certain well-established reasons this elevation is fixed with considerable certainty.

Unfortunately, for other equally well-established reasons, tractor hitch means are fairly standard in elevation, and much lower than the necessary elevation of trailer frames. Also, the usual tractor hitch means are located on the tractor axle and thus substantially between the rear wheels of the tractor, whether or not tread linkage is associated with these wheels. Thus a problem of considerable difficulty and equal importance of solution presents itself in the arrangement of means for establishing connection between the tractor drawbar or hitch means and the frame of the dump trailer.

Many solutions of this problem have been attempted. The trailer being balanced upon a single central axle means as it were, the drawbar connection must be rigid as to either the tractor or the trailer. Rigidity with the tractor may be dismissed as structurally impracticable. Where the drawbar means is rigid with the trailer, if it takes the form of a yoke or bail with a pair of members converging forwardly and downwardly from the forward corners of the trailer frame, as would be an ideal arrangement structurally, the maximum angularity between tractor and trailer is so limited by interference between the yoke drawbar structure and the tractor treads, that the minimum turning radius of the team, (tractor and trailer,) makes the team very unserviceable in the field. Where a single drawbar member is substituted for the yoke, extending forwardly and downwardly, and centrally of the trailer frame, the same operating limitations follow, although of course in lesser degree. Likewise, where the yoke drawbar structure is brought forwardly in the plane of the trailer frame, and includes a downwardly extending member at its forward end, the same undesirable conditions arise where the tractor running gear diameter is large as it frequently is.

It is an object of our invention to provide a trailer of the class described with drawbar means which shall render the trailer serviceable with any tractor means of usual contemporary construction, and allow ample, 90° or more, angularity between tractor and trailer. Briefly, our invention comprises in this respect the provision of an arched drawbar comprising a single drawbar tongue member extending forwardly of the tractor frame, as in the plane thereof or in a parallel plane thereabove, with a drawbar hitch member downwardly extending from the forward end of the tongue member and providing for connection with tractor hitch means.

A further object of our invention is to provide parts for the general arrangement described, such that the assembly shall be structurally efficient as well as novel.

Still a further object of our invention is to provide hitch means at the rear of the vehicle as on the frame, and means on the drawbar hitch member and intermediate the ends of the latter, providing for connection with the rear hitch means of a similar vehicle, whereby a plurality of such vehicles may be assembled in a train with any thereof in leading position, and tractor means hitched to the leading vehicle.

Figure 2:
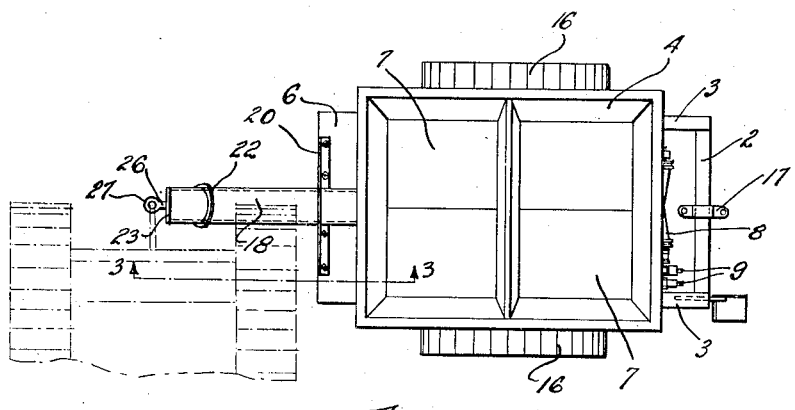
Figure 3:
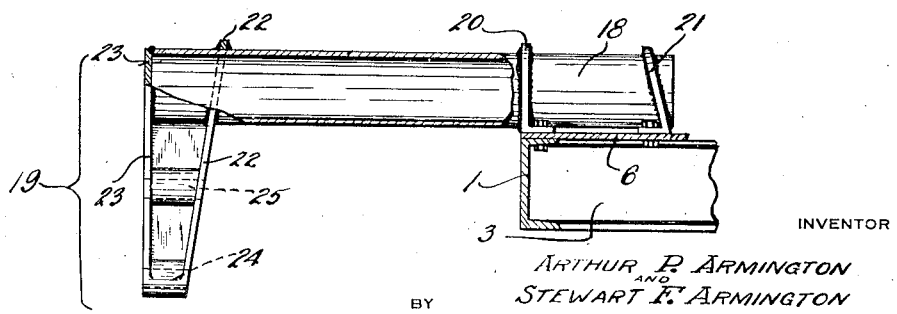

The exact nature of our invention together with further objects and advantages thereof will be apparent from the following description taken in connection with the accompanying drawings in which Fig. 1 is a perspective view of an embodiment of our invention taken from the forward left quarter and showing the vehicle body in normal horizontal or running position, and the dumping doors thereof open; Fig. 2 is a plane view of the same showing the doors in closed or load-carrying position, and in broken lines indicating the relative position of the rear portion of a typical tractor to which our trailer is hitched and with which the trailer is in sharp angular relation; and Fig. 3 is an enlarged detailed view as in the vertical plane of line 3—3, Fig. 2, of our improved drawbar showing details of the same, partly by section, and illustrating the preferred manner of relating and securing the same with the frame of the vehicle.

With reference now to the drawings, the frame of the vehicle is of generally rectangular form, built up of structural steel sections including front and rear end members 1, 2, and side members 3. A hopper 4 is mounted on the frame, the base of the hopper being shorter than the frame which latter, therefore, extends longitudinally therebeyond. Preferably the frame includes transverse members located between the frame side members 3 and along the hopper end walls at their bases. The frame may also include a plate 6 arranged transversely and overlying the forward frame member 1 and extending adjacent the forward hopper end.

Hinged to the side members of the frame for swinging movement between horizontal closed position as indicated Fig. 2, and downwardly and outwardly therefrom to open or dumping position as indicated Fig. 1, are a pair of doors 7. A drum 8 controlled by levers 9 is arranged as on the rear wall of the hopper 4, and a line 10 led therefrom over suitable sheaves on doors and frame for the purpose of controlling the doors. Thus the parts described constitute generally a load-containing body having a dumping bottom.

Mobile supporting means for this body are provided and in the embodiment shown comprise axle means of generally inverted U-form having a transverse member 11 arranged intermediate the frame ends and passing through the side frame members, with its ends fixed in brackets 12. The brackets in turn are secured with the side frame members and extend downwardly therefrom and carry at their ends outwardly turned stub axles 13. Running gear located on either side of the frame is associated with the stub axles 13, and as illustrated, the running gear is of the well-known creeper type comprising paired wheels 14 mounted on rocker beam 15 and having trained thereabout an endless tread linkage 16, the running gear being more or less conventionally shown. Thus the axle means by its arched form has immediate connection with the frame supporting the same well above the ground that the doors may clear the ground in open position, and whereby both axle means and frame will clear the dumped load.

It will be noted that the trailer body is free to tilt in fore and aft directions about the running gear and in the embodiment shown, upon an axis common with the stub shafts 13.

The axle means is substantially medial of the body so that the body is substantially balanced upon the running gear whether or not a load is being carried. Thus the trailer is generally of cart or two-wheeled type as distinguished from wagon or four-wheeled type.

At the rear of the frame and centrally thereof as secured with the rear member 2, is a hitch means 17 of any suitable form.

For the front of the trailer we provide draft means of arched form and having as its principal members a forwardly-extending tongue member 18 and a hitch member 19 secured at the forward end thereof and downwardly extending therefrom.

The tongue member 18 is hollow or tubular as indicated Fig. 3, and preferably is of circular and seamless section, and straight, that is, not bent.

The member 18 is preferably mounted to lie in a plane above that of the trailer frame; and to this end we provide a pair of spaced brackets 20, 21 having suitable openings through which the member 18 is inserted, the brackets and tongue member being welded together entirely about the tongue member and on either side of each bracket so that a very solid construction is had. The forward bracket 20 is bolted through the plate 6 to the upper flange of the frame member 1. The rear bracket 21 is preferably spaced correspondingly with the member 6 of the frame so that it also may be bolted thereto as shown Fig. 3. The tongue member 18 terminates rearwardly just behind the bracket 21 and thus adjacent the forward end of the hopper 4.

The hitch member 19 of the drawbar has a rear face or flange 22 through which the tongue 18 passes, these parts being welded together as in the case of the brackets 20, 21; and the tongue has a forward face or flange 23 extending upwardly to close the front of the tongue 18 with which it is welded. The member 19 also has a central web extending between the flanges 22 and 23 and upwardly to the tongue 18 with which it is welded; so that in typical horizontal section the hitch member is of H or I form. Thus the drawbar forms in effect an integral unit removably secured with the frame as by the bolts indicated.

The hitch member 19 is provided at its lower extremity with an opening 24 longitudianal of the vehicle and adapted to receive the usual draft bolt 26 with draft eye 27 for the purpose of establishing a hitch with a tractor drawbar. Above the opening 24 in the plane of the rear hitch means 17 and thus in the plane of the trailer frame, is an opening 25 parallel with the opening 24, and thus likewise adapted to optionally receive the draft bolt. The parts are so proportioned and arranged that when the hitch is established with the tractor drawbar, using the opening 24 for the purpose, the trailer body will be maintained in the horizontal position indicated Figs. 1 and 3. In this position of the trailer a sharp angularity such as the 90° relation indicated Fig. 2, may be assumed by the members of the team thus formed and, if it is desired to add another similar trailer to the first trailer to make a train, the opening 25 of the second trailer is used to receive a draft bolt the eye of which may be coupled with the rear hitch means of the first trailer by means of the usual coupling pin. Thus the body of the second trailer will be maintained in horizontal position by the tractor acting through the first trailer. Similarly, more trailers may be added to the train up to the drawbar capacity of the tractor, and all will be maintained in horizontal position, yet without imposing undue or substantially increased vertical load on the tractor, this because of the substantial balance of the body of each trailer on its running gear.

Attention is called to the extreme simplicity of the drawbar structure. The drawbar comprises a single pair of members, a straight horizontally disposed tubular tongue member and a straight vertically disposed hitch member of I section. Under many conditions of service the tractor drawbar pull is in a transverse plane resulting in a crank action in which the hitch member acts as a crank upon the tongue member. Thus the tongue member is subjected to severe stresses in torque and must be of ample size to take care of these stresses. The tongue member is short, and when it is of sufficient transverse dimension, to take care of these stresses, bending operations in fabrication of the tongue member become very impractical. The hitch member on the other hand, by the arrangement described, is only subjected to bending and to maximum bending only in planes either longitudinal or transverse to the vertical. Thus the I section in the hitch member is ideal. Likewise, whether the web of the hitch member extend longitudinally as shown, or transversely, the hitch member flanges are very nicely adapted to extend upwardly into the zone of the tongue member as shown, for securement with the tongue member.

Preferably the parts are so proportioned and arranged, and this follows from the weight of the trailer drawbar, that the trailer while substantially balanced upon its running gear has a slight preponderance of balance forwardly so that in case of breakage or release of the hitch, the trailer body will tilt forwardly rather than rearwardly. In such case the tilt is slight owing to the downward extension of the hitch member 19. Thus, limiting the tilt is important since the center of mass of the tilting parts, that is of the body including the drawbar, is necessarily considerably above the axis of tilt, so that each additional angle of tilt increases the out-of-balance in greater proportion than the angularity increases.

We have found that with the arrangement described, a dump trailer may be easily proportioned so that a single man can raise the forward end sufficiently off the ground to effect a hitch with either the tractor, or similar trailer in operating position, and this notwithstanding a trailer weight of several tons.

We claim:

1. A dump trailer cart provided at one end with a fixed drawbar having separate hitch means at two levels, the lower for connection with a tractor and the upper for connection to another similar trailer in a train, said drawbar being arched to clear the treads of a tractor to which it may be hitched, said trailer having at its other end hitch means at the upper of said levels.

2. In a vehicle of the class described and having an elevated load-carrying body and mobile supporting means therefor, hitch means at the rear of said body, and drawbar means at the front of said body and comprising a tongue member extending forwardly of the body and carrying at its forward end a depending hitch member, and having the lowest extremity of a portion intermediate the body and the hitch member elevated above the lowermost forward body portion, said hitch member extending downwardly below the elevation of said rear hitch means and having at its lower end hitch means for connection with tractor hitch means, and having at the elevation of said rear hitch means, hitch means for connection with the rear hitch means of a similar vehicle.

3. In a vehicle of the class described and having an elevated horiozntally disposed frame, an arched drawbar having a single horizontal tongue member, overlying and secured with said frame and extending forwardly thereof, with a hitch member downwardly extending from the forward end of said tongue member and having at its lower end hitch means for connection with tractor hitch means located between tractor treads and below the plane of said frame, hitch means at the rear of said frame, said hitch member having hitch means in the plane of said frame for connection with the rear hitch means of a similar vehicle.

4. In a vehicle of the class described and having an elevated frame, a drawbar having a single straight tongue member, overlying and secured with said frame and extending forwardly thereof, with a hitch member downwardly extending from the forward end of said tongue member and having at its lower end hitch means for connection with tractor hitch means located between tractor treads, said hitch member being of I form in horizontal section, with the flange portions of the section extending into the zone of said tongue member and secured therewith.

In testimony whereof we hereby affix our signatures.

ARTHUR P. ARMINGTON.
STEWART F. ARMINGTON.